United States Patent
Wu

(10) Patent No.: US 8,154,269 B2
(45) Date of Patent: Apr. 10, 2012

(54) CONTROL APPARATUS AND CONTROL METHOD FOR A POWER FACTOR CORRECTION POWER CONVERTER

(75) Inventor: Tsung-Hsiu Wu, Hsinchu (TW)

(73) Assignee: Leadtrend Technology Corporation, Hsinchu (TW)

( * ) Notice: Subject to any disclaimer, the term of this patent is extended or adjusted under 35 U.S.C. 154(b) by 464 days.

(21) Appl. No.: 12/500,829

(22) Filed: Jul. 10, 2009

(65) Prior Publication Data

US 2010/0046262 A1 Feb. 25, 2010

(30) Foreign Application Priority Data

Aug. 21, 2008 (TW) ................. 97131900 A

(51) Int. Cl.
*G05F 5/00* (2006.01)
*G05F 1/10* (2006.01)

(52) U.S. Cl. ......... 323/301; 323/222; 323/235; 323/284

(58) Field of Classification Search ............. 323/222, 323/235, 247, 282, 284, 285, 288, 290, 299, 323/301, 302
See application file for complete search history.

(56) References Cited

U.S. PATENT DOCUMENTS

| | | | | |
|---|---|---|---|---|
| 5,644,214 A | * | 7/1997 | Lee | 323/211 |
| 7,064,527 B2 | * | 6/2006 | Adragna | 323/207 |
| 7,116,090 B1 | * | 10/2006 | Yang et al. | 323/288 |
| RE40,016 E | * | 1/2008 | Ribarich et al. | 363/89 |
| 2010/0046261 A1 | * | 2/2010 | Wu | 363/126 |

* cited by examiner

*Primary Examiner* — Jessica Han
(74) *Attorney, Agent, or Firm* — Thomas, Kayden, Horstmeyer & Risley, LLP

(57) ABSTRACT

A control apparatus and a control method for a power factor correction power converter are provided. The control apparatus is configured to reduce the variation rate of a reference signal with a rising portion and a falling portion. When the primary winding almost completely releases the stored energy, and the falling portion of the reference signal reaches a determined condition, the control apparatus turns on a switch for increasing the stored energy of the primary winding.

10 Claims, 8 Drawing Sheets

CONTROL APPARATUS AND CONTROL METHOD FOR A POWER FACTOR CORRECTION POWER CONVERTER

This application claims priority to Taiwan Patent Application No. 097131900 filed on Aug. 21, 2008, the disclosures of which are incorporated herein by reference.

CROSS-REFERENCES TO RELATED APPLICATIONS

Not applicable.

BACKGROUND OF THE INVENTION

1. Field of the Invention

The present invention provides an alternative current (AC) to direct current (DC) converter structure, and more particularly, provides an AC to DC converter structure with a power factor correction (PFC) capability.

2. Descriptions of the Related Art

In most AC to DC converters, the whole circuit should exhibit a pure resistive nature to an AC input voltage. For this reason, a variety of active PFC structures have been developed which, in response to an AC input voltage, may generate a corresponding AC input current.

In the design of PFC, it is essential to generate a sinusoidal current with very low total harmonic distortion (THD). Both the THD and the power factor reflect the operational performances of a PFC circuit. The power factor has a maximum value of 1, and generally in practice, a THD value is acceptable as long as it is less than 15%.

FIG. 1 shows a PFC circuit 20 with a boost-type converter topology disclosed in U.S. Pat. No. re40016. PFC circuit 20 receives an input voltage $V_{IN}$, which may be a rectified AC voltage. Resistors 38 and 40 form a voltage divider configured to provide a feedback signal $V_{INV}$ to a terminal INV of an integrated circuit (IC) 32 by detecting a DC output voltage $V_O$ of a load capacitor 76. Capacitor 42 acts as a low-pass filter for filtering out high-frequency components of the feedback signal $V_{INV}$, generating a comparison signal $V_{CMP}$ to a terminal CMP of IC 32. Secondary winding 39 corresponding to booster inductor 34 detects the zero-crossing of the current flowing through booster inductor 34, which is accomplished via a zero current detection (ZCD) terminal of IC 32.

In PFC circuits, the conventional ICs are configured to internally generate a sawtooth signal for comparison against the comparison signal $V_{CMP}$ at the CMP end to modulate the on-time of the switch. The basic idea is that when the DC output voltage $V_O$ is at a high level, the on-time of switch 36 shall be shortened to reduce the energy transferred to the output capacitor. The level of the comparison signal $V_{CMP}$ decreases as the output voltage $V_O$ increases. When the switch is turned on, the sawtooth signal $V_{saw}$ begins to rise. Once the rising sawtooth signal $V_{saw}$ reaching to or higher than the voltage level of the comparison signal $V_{CMP}$, the switch is turned off and, accordingly, the sawtooth signal Vsaw suddenly decreases to and then remains at a minimum level without falling portion. The re-opening of the switch is triggered by purely detecting the occurrence of zero-crossing of the current flowing through the booster inductor, and the rising portion of the sawtooth signal Vsaw begins at the same time. In few successive periods of the AC input voltage $V_{IN}$, the comparison signal $V_{CMP}$ may be considered a constant value, so the on-time of the switch also remains roughly at a constant value.

In U.S. Pat. No. re40016, the on-time of switch 36, rather than determined solely by the comparison signal $V_{CMP}$, may be extended slightly to mitigate cross-over distortion as the off-time decreases "Cross-over distortion" means the THD contributed when the level of the input voltage $V_{IN}$ approaches the minimum point because of the insufficient voltage across booster inductor 34 to provide power. The mitigation of the cross-over distortion will lead to a decrease in the THD.

However, even if the on-time is extended slightly as the off-time decreases, the off-time may still be over short, causing unnecessary high-frequency switching loss. Besides, the variation of the on-time along with the variation of the off-time may cause an increase in the THD contrary to expectation.

SUMMARY OF THE INVENTION

The primary objective of the present invention is to provide a control apparatus applied in a power-factor-correction (PFC) power converter. The converter comprises a primary winding, an auxiliary winding and a power switch. The primary winding is coupled to receive an input voltage and controlled by the power switch to increase or release the stored energy. The control apparatus comprises a reference signal generator, a detection circuit, and a driving circuit. The reference signal generator for generating a reference signal having a rising and falling portion. The slew rate of the reference signal is adjustable. The detection circuit for determining whether the input voltage approaches a zero voltage, and detecting whether the stored energy of the primary winding is almost completely released. The driving circuit for turning on the power switch to increase the stored energy of the primary winding when the stored energy of the primary winding is almost completely released and the falling portion of the reference signal reaches a predetermined condition. When the input voltage approaches the zero voltage, the slew rate of the reference signal is reduced.

Another objective of the present invention is to provide a control method applied in a power-factor-correction (PFC) power converter. The converter comprises a primary winding, an auxiliary winding and a power switch. The primary winding is coupled to receive an input voltage and is controlled by the power switch to increase or release the stored energy. The method comprises the following steps: generating a reference signal with a rising and falling portion; detecting whether the input voltage approaches the zero voltage; reducing the slew rate of the reference signal when the input voltage approaches the zero voltage; detecting the stored energy of the primary winding; detecting the falling portion of the reference signal; and turning on the power switch to increase the stored energy of the primary winding when the stored energy of the primary winding is almost completely released and the falling portion of the reference signal reaches a predetermined condition.

DESCRIPTION OF THE PREFERRED EMBODIMENT

Figure 1:
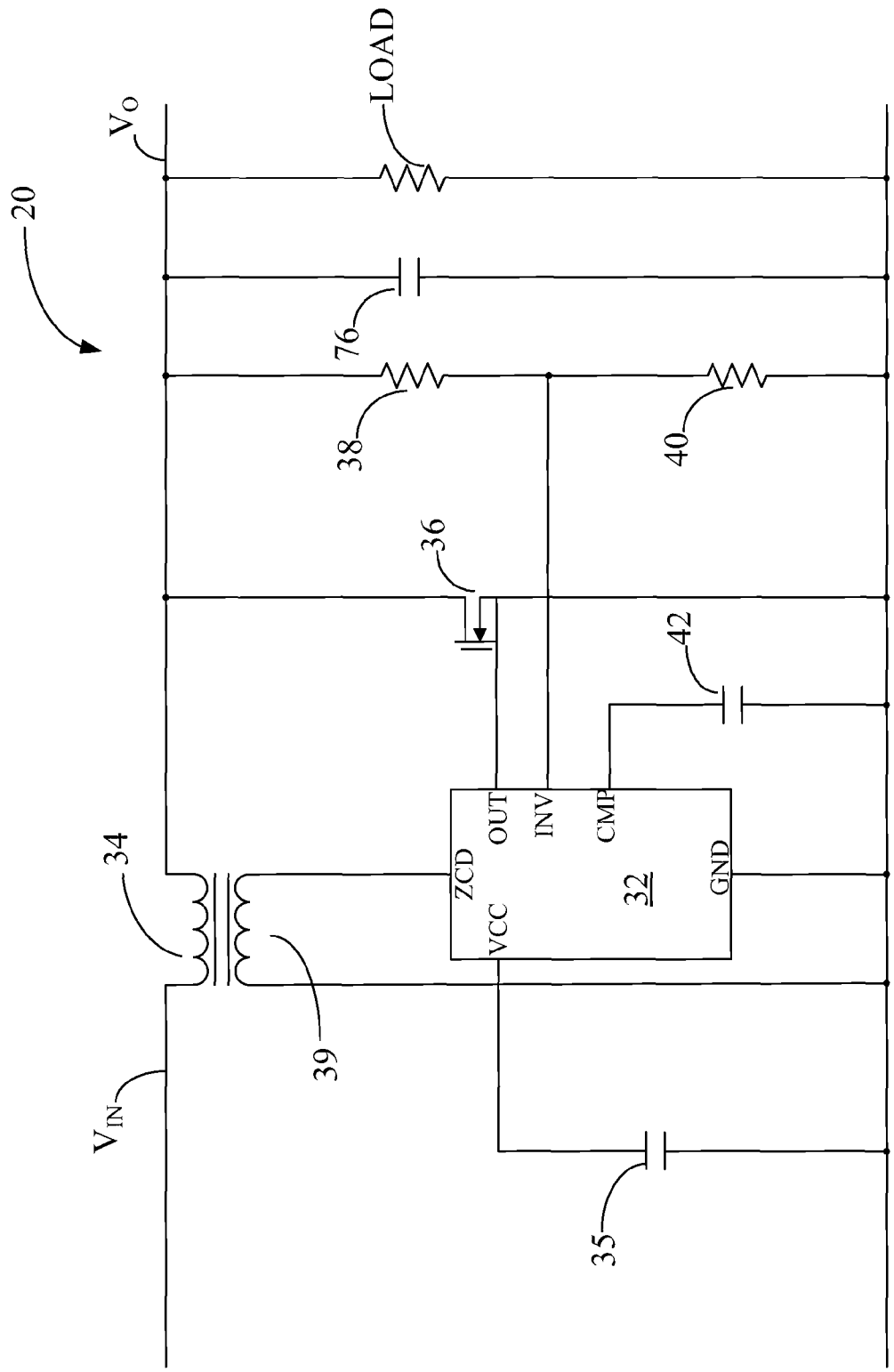
FIG. 1 depicts a PFC circuit of the prior art disclosed in U.S. Pat. No. re40016.

In the following description, this invention will be explained with reference to embodiments thereof. However, these embodiments are not intended to limit this invention to any specific environment, applications or particular implementations described in these embodiments. Therefore, the description of these embodiments is only for purposes of illustration rather than to limit this invention. It should be appreciated that in the following embodiments and the attached drawings, elements not related directly to this invention are omitted from depiction. To facilitate the understanding of the technical concepts of this invention, identical or similar elements or those with similar functions are labeled with the same reference numerals in the description. However, it should be emphasized that elements bearing the same labels in different embodiments may be implemented as different elements.

Figure 2:
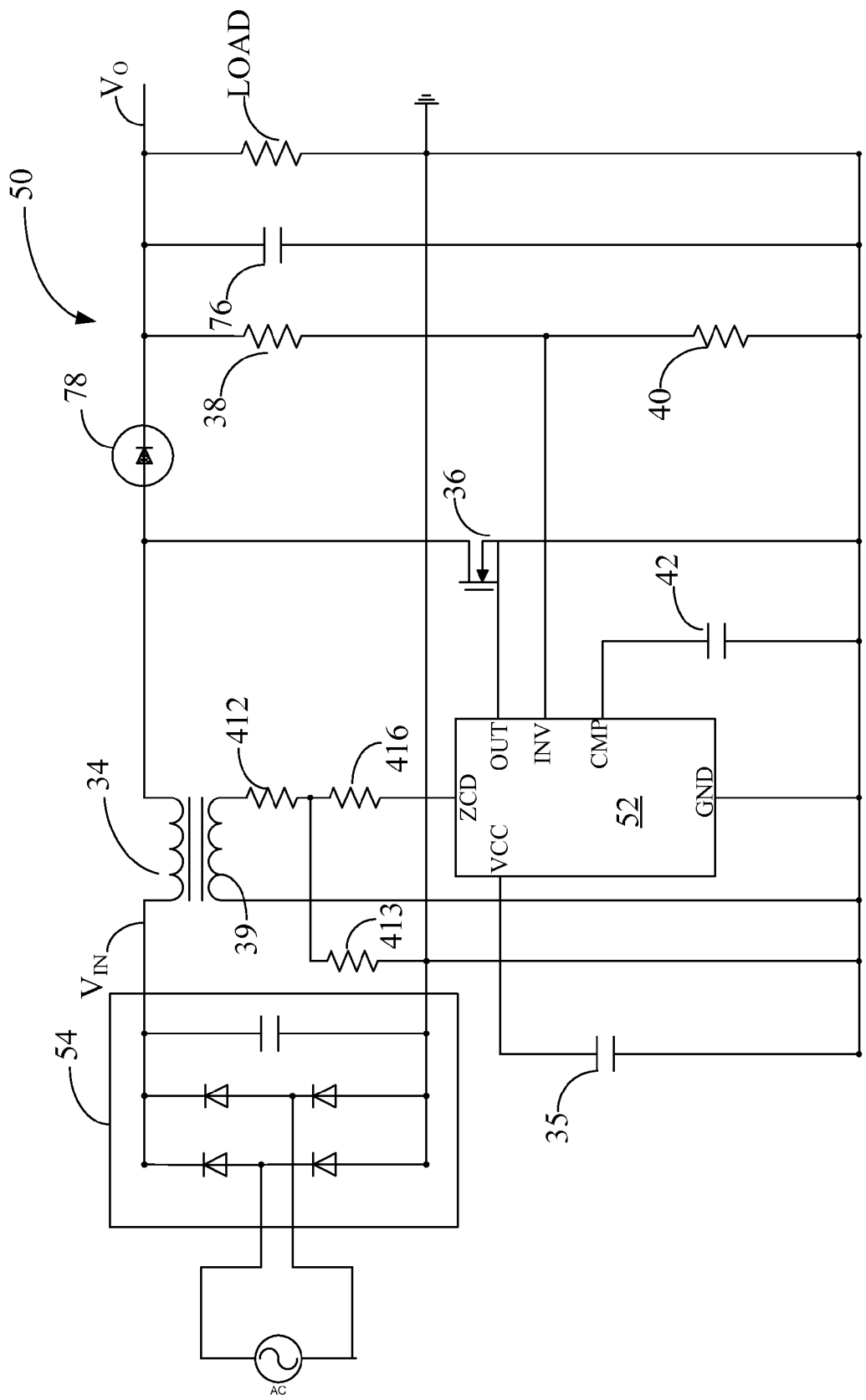
FIG. 2 is a schematic view of an AC to DC converter according to an embodiment of this invention.

As shown in FIG. 2, an AC to DC converter 50 according to an embodiment of this invention is depicted therein. A rectifier 54 is configured to rectify an AC voltage to generate an input voltage $V_{IN}$. Booster inductor 34, switch 36, capacitors 42, 76, and 35, resistors 38 and 40, and diode 78 all have similar operating principles or play similar roles to those of FIG. 1, and are well-known to those skilled in the art; hence, connections and functions thereof will not be further described herein for simplicity.

FIG. 2 differs from FIG. 1 primarily in the connection between IC 52 and auxiliary winding 39 as well as the internal operations or structures of IC 52. Auxiliary winding 39 is connected to a voltage divider formed by resistors 412 and 413. A voltage dividing point of the voltage divider may be connected to a terminal ZCD of IC 52 directly or through an optional resistor 416. According to such a circuit connection, terminal ZCD of IC 52 may serve as a multi-function pin, which not only detects the zero-crossing of booster inductor 34 current, but also detects whether the input voltage $V_{IN}$ approaches its minimum value. For example, through terminal ZCD and auxiliary winding 39, IC 52 may detect whether the stored energy in booster inductor 34 is almost completely released to generate zero-crossing of the inductor current when switch 36 is turned off. Similarly, through terminal ZCD and auxiliary winding 39, IC 52 may detect a value of the voltage $V_{IN}$ when switch 36 is turned on to determine whether the input voltage $V_{IN}$ approaches a zero voltage and take corresponding measures.

Figure 3:
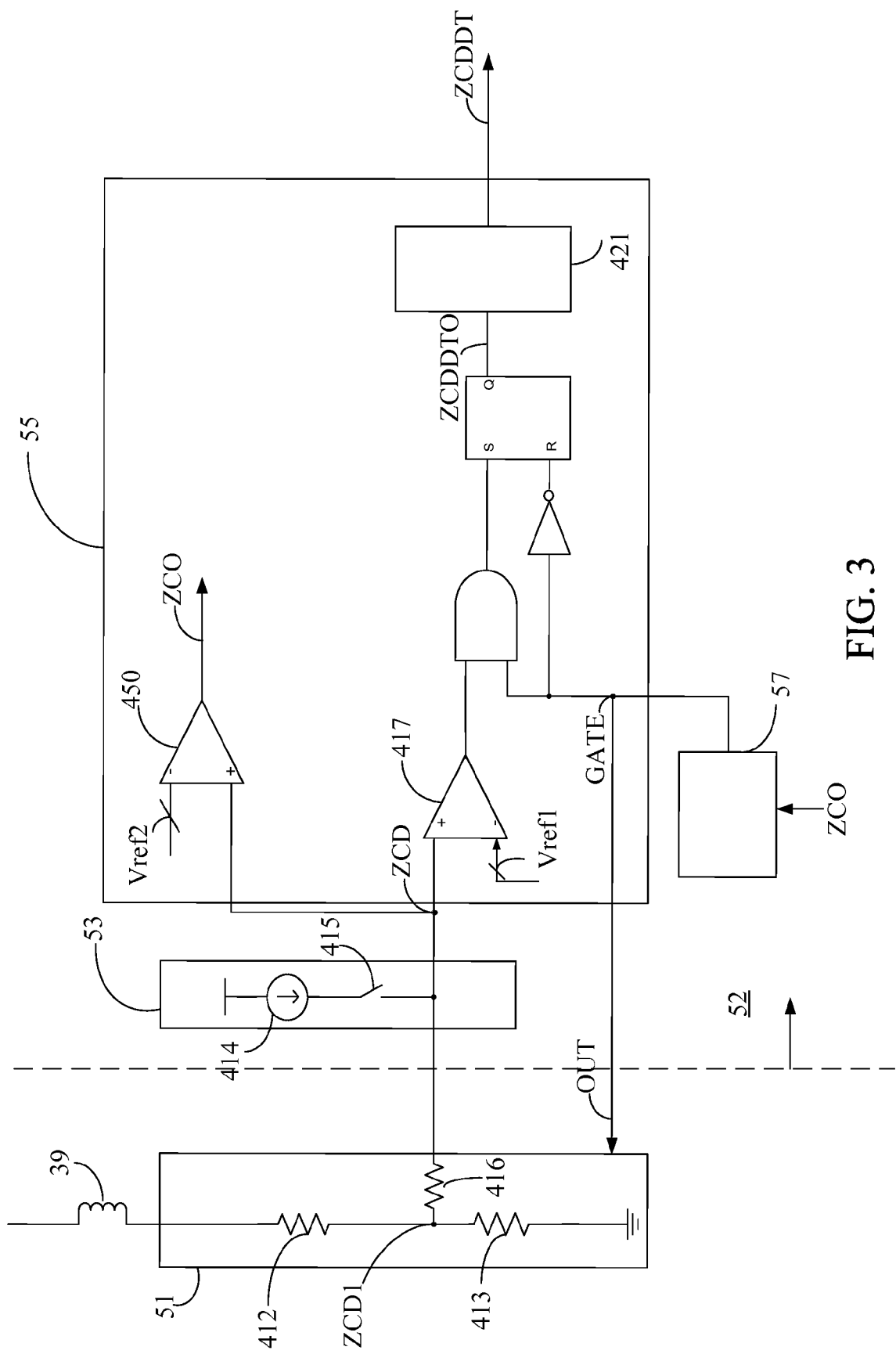
FIG. 3 is a schematic view illustrating connections between the internal portions of the circuitry of an IC shown in FIG. 2 and some peripheral devices.

FIG. 3 is a schematic view illustrating the connections between the internal portions of circuitry within IC 52 shown in FIG. 2 and some peripheral devices. Within IC 52 are provided a driving circuit 57, a detection circuit 55 and a regulation circuit 53.

Driving circuit 57 is configured to turn on or off switch 36 through a terminal Gate or a terminal Out of the IC 52 to increase or release the stored energy in the booster inductor 34 (i.e., a primary winding).

When switch 36 is turned off, a comparator 450 in detection circuit 55 detects the voltage at node ZCD to determine whether the stored energy in booster inductor 34 is almost completely released. In detail, when switch 36 is turned off, and the current in booster inductor 34 is approaching to zero, the voltage across auxiliary winding 39 will experience a sudden drop, resulting in a sudden drop in the voltage at node ZCD through voltage signal generation circuit 51. In this way, it is possible for comparator 450 to determine whether the stored energy in booster inductor 34 is almost completely released by detecting such a voltage drop.

When switch 36 is turned on, comparator 417 and the subsequent circuits in detection circuit 55 determine whether the input voltage $V_{IN}$ approaches a zero voltage. When switch 36 is turned on, the voltage across booster inductor 34 is substantially equal to the value of the input voltage $V_{IN}$. The voltage across auxiliary winding 39 is in direct proportion to the voltage across booster inductor 34 by a factor of the turn ratio. The voltage at the node ZCD is also approximately proportional to the voltage across auxiliary winding 39. Therefore, when switch 36 is turned on, the voltage at node ZCD could be adapted to represent the value of the input voltage $V_{IN}$, so comparator 417 can determine whether the input voltage $V_{IN}$ approaches the zero voltage by detecting the voltage at node ZCD. Moreover, when switch 36 is turned on, regulation circuit 53 can simultaneously turn on switch 415 to shift or regulate the voltage value at node ZCD by means of a current source 414 to make the voltage at the node ZCD easier for detection. This will be described in detail hereinafter.

Figure 4:
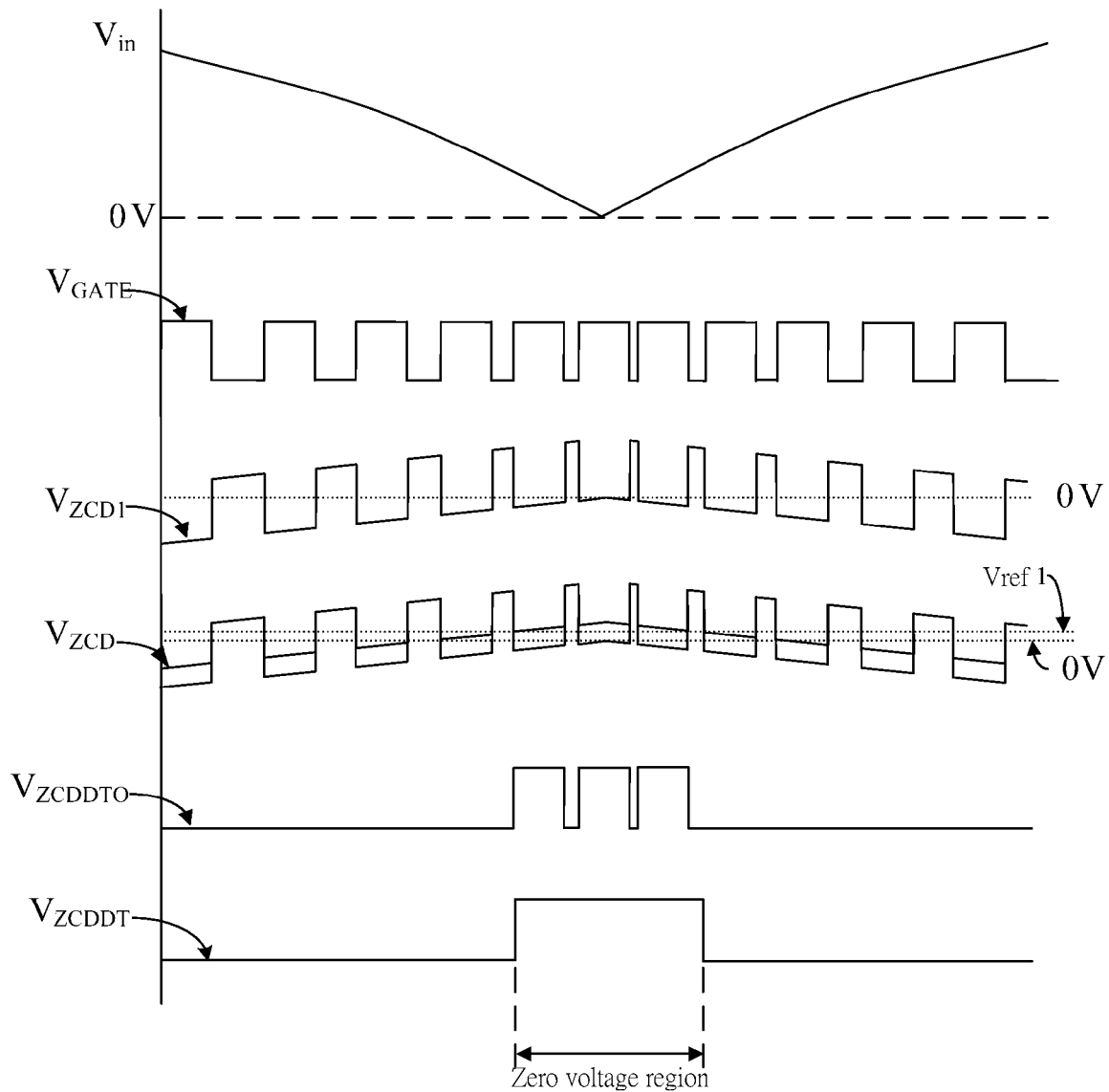
FIG. 4 is a schematic view illustrating voltage signals at some nodes in FIGS. 2 and 3.

FIG. 4 illustrates voltage signals at some nodes in FIGS. 2 and 3. From top to bottom, the curves in this figure represent voltage signals at nodes $V_{IN}$, Gate, ZCD1, ZCDDTO and ZCDDT respectively. It can be seen from this figure that the voltage signal $V_{IN}$ decreases gradually to a minimum value and then rises again. The voltage signal $V_{GATE}$ at node Gate has a roughly constant on-time and a variable off-time that increases or decreases synchronously with the voltage signal $V_{IN}$. When the voltage signal $V_{GATE}$ is at a low level, i.e., the switch 36 is turned off, voltages $V_{ZCD1}$ and $V_{ZCD}$ at nodes ZCD1 and ZCD respectively can be given by the following equation (1):

$$V_{ZCD} = V_{ZCD1} = \frac{R_{413}}{R_{413} + R_{412}} \cdot V_{39} = \frac{R_{413}}{R_{413} + R_{412}} \cdot \left(\frac{N_{39}}{N_{34}}\right) \cdot (V_{IN} - V_O) \quad (1)$$

where $R_x$ represents a resistance value of the resistor x, $V_{39}$ represents a voltage across auxiliary winding 39, and $N_{39}$ and $N_{34}$ represent the turning numbers of auxiliary winding 39 and booster inductor 34 respectively.

When the voltage $V_{GATE}$ is at a high level, i.e., switch 36 is turned on, the voltage $V_{ZCD}$ at node ZCD and the voltage $V_{ZCD1}$ at node ZCD1 can be given by the following equations (2) and (3) respectively:

$$V_{ZCD} = \frac{R_{413}}{R_{413} + R_{412}} \cdot V_{39} + \left(\frac{R_{413} \cdot R_{412}}{R_{413} + R_{412}} + R_{416}\right) \cdot I_{414} \quad (2)$$

$$= \frac{R_{413}}{R_{413} + R_{412}} \cdot \left(-\frac{N_{39}}{N_{34}} \cdot V_{IN}\right) + \left(\frac{R_{413} \cdot R_{412}}{R_{413} + R_{412}} + R_{416}\right) \cdot I_{414}$$

$$V_{ZCD1} = \frac{R_{413}}{R_{413} + R_{412}} \cdot \left(\frac{N_{39}}{N_{34}} \cdot V_{IN}\right) + \left(\frac{R_{413} \cdot R_{412}}{R_{413} + R_{412}}\right) \cdot I_{414} \quad (3)$$

where $I_{414}$ represents a current value of the current source 414.

Accordingly, the voltage signals $V_{ZCD}$ and $V_{ZCD1}$ in FIG. 4 are plotted based on the above equations (2) and (3). The bottom dashed line in the curve of the voltage signal $V_{ZCD}$ represents the corresponding voltage signal $V_{ZCD1}$ at the same time points. It can be seen that when switch 36 is turned on, the voltage signal $V_{ZCD}$ at node ZCD is higher than the voltage signal $V_{ZCD1}$ at node ZCD1 because of presence of the resistor 416. In other words, in case the voltage signal $V_{ZCD1}$ at node ZCD1 is not high enough for comparator 417 to determine whether the input voltage $V_{IN}$ approaches a zero voltage, resistor 416 may be provided to generate a voltage signal $V_{ZCD}$ of a higher level at node ZCD.

When switch 36 is turned off, once the voltage signal $V_{ZCD}$ falls below a reference voltage value $V_{ref2}$, comparator 450 determines that the stored energy in booster inductor 34 has almost completely been released. Subsequently, through node ZCO, comparator 450 enables driving circuit 57 to turn on switch 36.

When switch 36 is turned on and the voltage signal $V_{ZCD}$ at node ZCD higher than the reference voltage $V_{ref1}$, comparator 417 determines that the input voltage $V_{IN}$ has approached the zero voltage. FIG. 4 shows a voltage signal $V_{ZCDDTO}$ at the node ZCDDTO, a high level of which represents that the input voltage $V_{IN}$ has fallen below a certain level, i.e., has approached the zero voltage. Circuit 421 in FIG. 3 maintains the high level portion of the voltage signal $V_{ZCDDTO}$ for one switching period to remove the low level portions between the two high level portions of the voltage signal $V_{ZCDDTO}$, thus generating a voltage signal $V_{ZCDDT}$ with a single pulse at node ZCDDT.

Hence, according to the embodiment shown in FIG. 3, the pulse in the voltage signal $V_{ZCDDT}$ can function as a signal for indicating a zero voltage crossing zone to direct other circuits of IC 52 to take necessary actions. For instance, once IC 52 determines that the zero voltage crossing zone has been reached, it will extend the on-time of switch 36 slightly.

Figure 5:
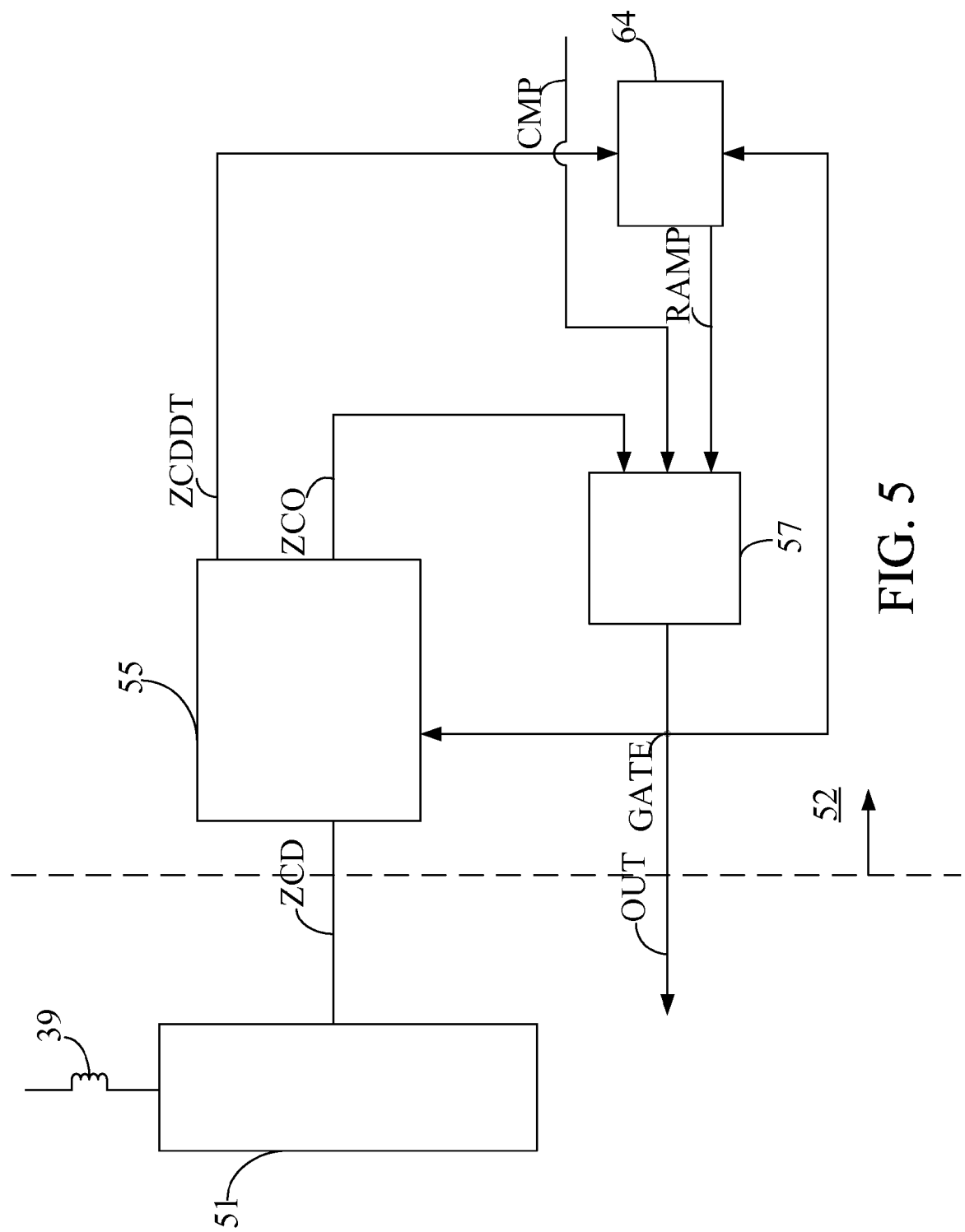
FIG. 5 is a schematic view illustrating connections between the internal portions of the circuitry of an IC shown in FIG. 2 and some peripheral devices.
Figure 6:
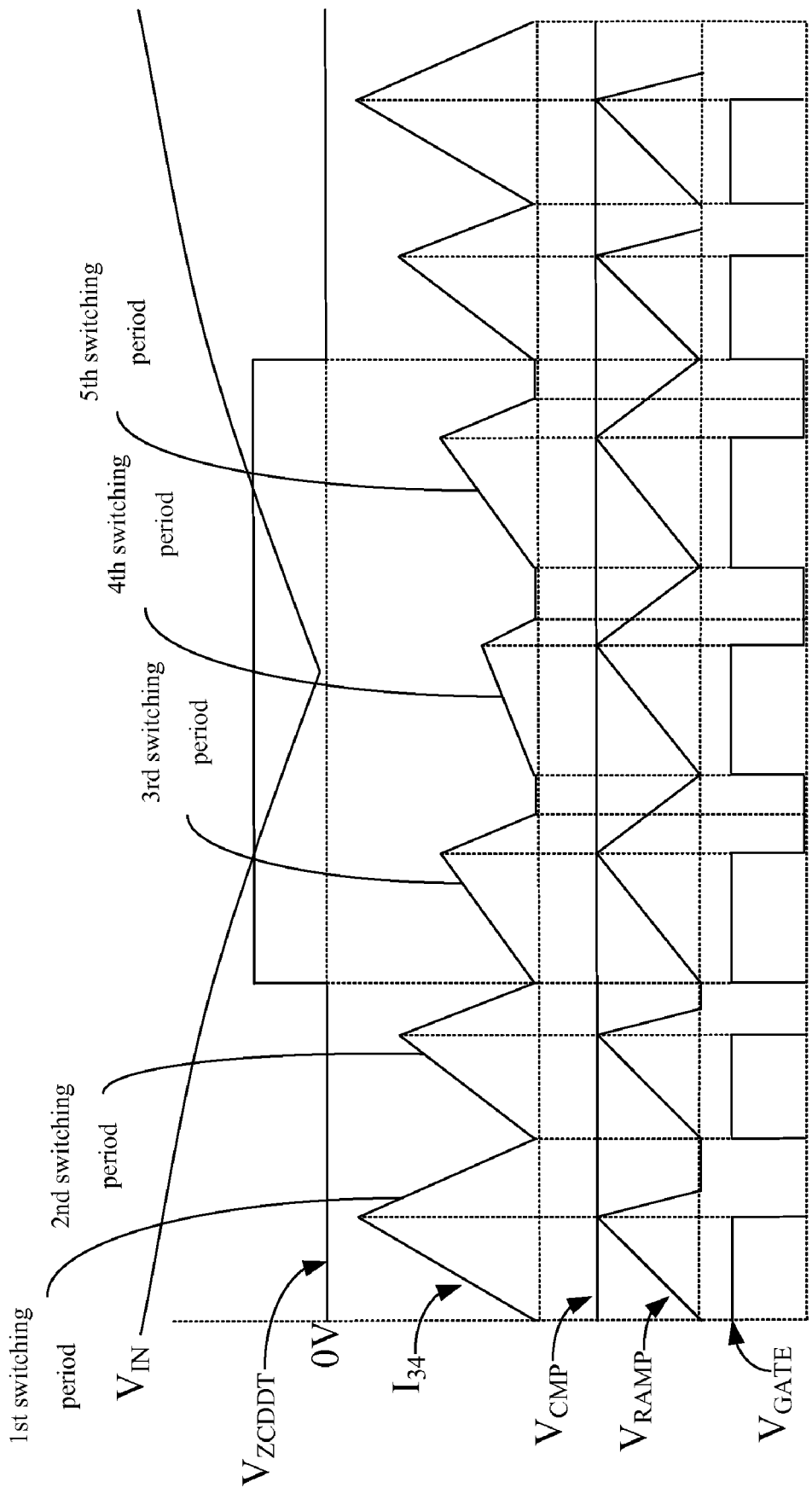
FIG. 6 is a schematic view illustrating voltage signals at some nodes in FIGS. 2 and 5.

FIG. 5 is a schematic view illustrating the connections between portions of the internal circuitry within IC 52 shown in FIG. 2 and some peripheral devices. Disposed within IC 52 are driving circuit 57, detection circuit 55, and reference signal generator 64. FIG. 6 illustrates voltage signals at some nodes shown in FIGS. 2 and 3. From top to bottom, the curves in FIG. 6 represent $V_{IN}$, the voltage signal $V_{ZCDCT}$ at node ZCDDT, a current signal $I_{34}$ through booster inductor 34, and the voltage signals $V_{CMP}$, $V_{RAMP}$ and $V_{Gate}$ at nodes CMP, RAMP and Gate.

In reference to FIGS. 5 and 6, detection circuit 55 in FIG. 7 is coupled to terminal ZCD of IC 52. Detection circuit 55 is configured to determine whether the input voltage $V_{IN}$ approaches the zero value and to detect whether the stored energy in booster inductor 34 almost completely releases. As the input voltage $V_{IN}$ falls and raises, detection circuit 55 correspondingly outputs a pulse from the terminal ZCDDT to indicate the zero voltage crossing zone of the input voltage $V_{IN}$, as shown in FIG. 6. On the other hand, detection circuit 55 also outputs a voltage signal at the terminal ZCO to notice driving circuit 57 that the current through the booster inductor 34 is approaching to zero, i.e. the energy stored in booster inductor 34 is almost released.

The reference signal generator 64 in FIG. 7 is coupled to terminals ZCDDT and GATE. Through terminal RAMP, reference signal generator 64 outputs a reference signal $V_{RAMP}$ with a rising portion and a falling portion, as shown in FIG. 6.

As shown in FIG. 6, when $V_{GATE}$ (the voltage signal at node Gate) is at a high level, switch 36 is turned on to increase the stored energy in booster inductor 34, and the current $I_{34}$ increases linearly with time accordingly. Meanwhile, the reference signal $V_{RAMP}$ is pulled up, resulting in the rising portion. Once the rising portion of the reference signal $V_{RAMP}$ reaches or goes higher than the voltage level of the comparison signal $V_{CMP}$, $V_{GATE}$ transitions to a low level to turn off switch 36, and accordingly, the current $I_{34}$ begins to decrease linearly with the time. Meanwhile, the reference signal $V_{RAMP}$ begins to decrease gradually, thus resulting in the falling portion. As shown by the $1^{st}$ and $2^{nd}$ switching periods in FIG. 6, when the stored energy in booster inductor 34 almost completely releases, i.e., when the current $I_{34}$ approaches the zero value, $V_{GATE}$ transitions from the low level to the high level to begin the next switching period.

The slew rate of $V_{RAMP}$ can be varied, particularly, for instant, depending on whether the input voltage $V_{IN}$ falls within the zero voltage crossing zone. In FIG. 6, when the input voltage $V_{IN}$ fall within the zero voltage crossing zone, both the rising rate of the rising portion and the falling rate of the falling portion of $V_{RAMP}$ decline. In the embodiment of FIG. 6, the $3^{rd}$, $4^{th}$ and $5^{th}$ switching periods are all overlapped with the pulse outputted at terminal ZCDDT, in which all the rising rate and the falling rate of $V_{RAMP}$ become lower (slower) than those in the $1^{st}$ and $2^{nd}$ switching periods not overlapped with the pulse. In other embodiments, it is possible that only the rising rate of the rising portion or the falling rate of the falling portion of $V_{RAMP}$ declines in the zero voltage crossing zone. The decline of the rising rate of the rising portion means that the on-time is extended in the zero voltage crossing zone, which results in a decreased cross-over distortion and decreased THD. Unlike the case of the $1^{st}$ and $2^{nd}$ switching periods, in the $3^{rd}$, $4^{th}$ and $5^{th}$ switching periods, $V_{GATE}$ will not transition immediately from the low level to the high level when the current $I_{34}$ approaching zero, but waits until the falling portion of the reference signal $V_{RAMP}$ falls to the lowest point. In other words, in the embodiment shown in FIG. 6, one of the conditions for $V_{GATE}$ transiting from the low level to the high level is that the stored energy in the booster inductor 34 almost completely releases and the falling portion of the reference signal $V_{RAMP}$ reaches the lowest point. This also means that extending the off-time may result in the decrease of the switching frequency and consequent decrease of unnecessary switching loss.

Figure 7A:
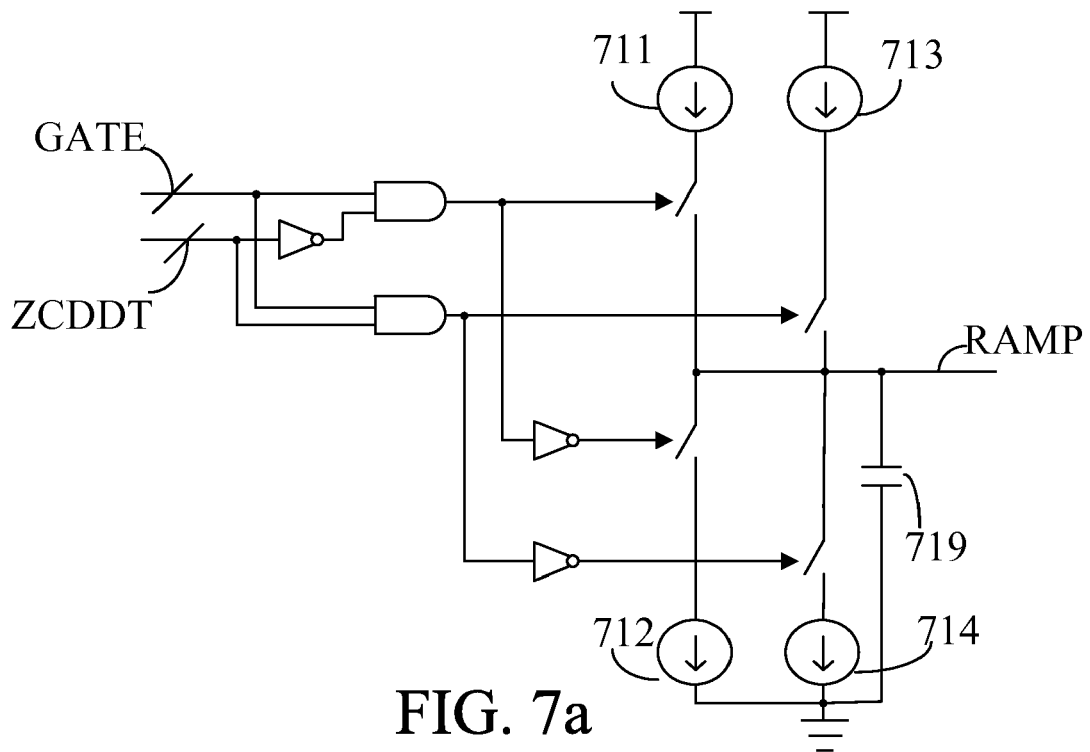
FIGS. 7a and 7b are schematic views illustrating two embodiments of the reference signal generator shown in FIG. 5 respectively.

FIG. 7a depicts an embodiment of reference signal generator 64 shown in FIG. 7. When the voltage signal at node ZCDDT is at the low level (i.e., currently outside the zero voltage crossing zone), capacitor 719 is charged by current sources 711 and 713 together or discharged by current sources 712 and 714 together. On the other hand, when the voltage signal at node ZCDDT is at the high level (i.e., currently in the zero voltage crossing zone), capacitor 719 is charged by current source 711 alone or discharged by current source 712 alone. Considering the current source(s) for charging the capacitor as a charging current source(s), the current value of the charging current source(s) will decrease in the zero voltage crossing zone. Likewise, the current value of the discharging current source(s) will also decrease in the zero voltage crossing zone. Hence, when the voltage enters from outside into the zero voltage crossing zone, the slew rate of the reference signal $V_{RAMP}$ will decrease.

Figure 7B:
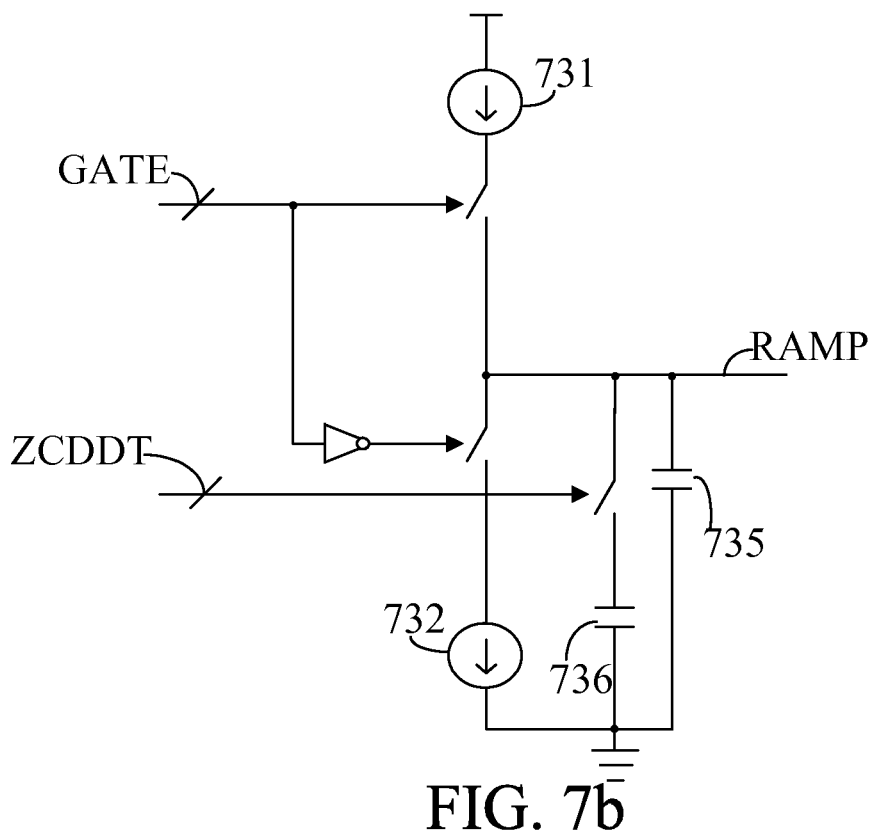

FIG. 7b depicts another embodiment of the reference signal generator 64 shown in FIG. 7. When the voltage signal at the node ZCDDT is at the low level, capacitor 735 is charged by current source 731 or discharged by current source 732. On the other hand, when the voltage signal at the node ZCDDT is at the high level, both capacitor 735 and 736 are charged together by current source 731 or discharged together by current source 732. Therefore, the capacitance values of the charged or discharged capacitors decrease when the voltage enters the zero voltage cross zone. Similarly, it can be inferred that the slew rate of the reference signal $V_{RAMP}$ will decrease when the voltage enters from outside into the zero voltage crossing zone.

Figure 8B:
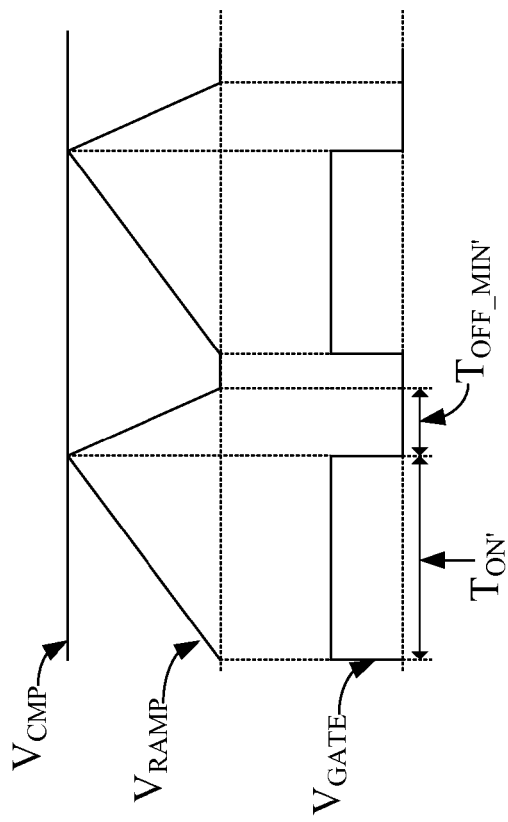
FIGS. 8a and 8b are schematic views illustrating signal variations under two different load conditions.
Figure 8A:
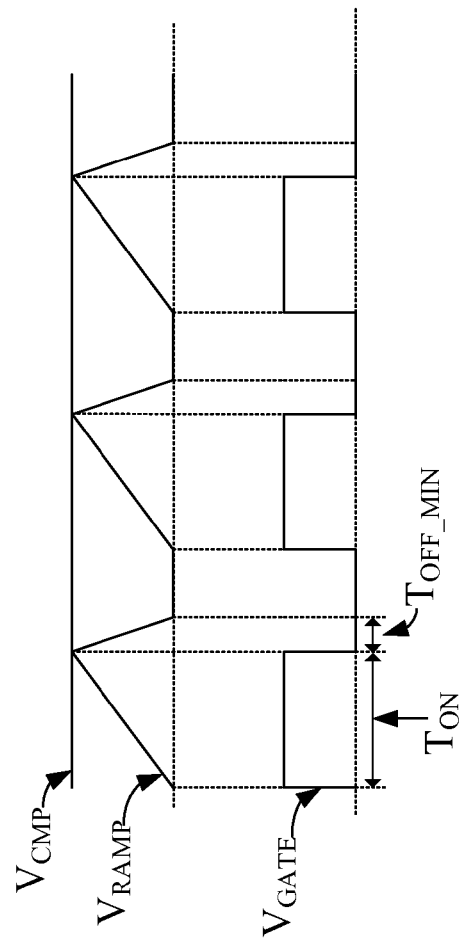

The embodiment of this invention can generate an adaptive minimum off-time ($T_{OFF-MIN}$) that varies with the load. FIGS. 8a and 8b illustrate signal variations under two different load conditions. As known from the background of this invention, the on-time ($T_{ON}$, $T_{ON}$) of the switch in FIGS. 8a and 8b is extended as $V_{CMP}$ rises or as the output voltage $V_O$ decreases. Accordingly, an extended on-time provides more energy to be transmitted to the load to increase the output voltage $V_O$. As described in the embodiment of this invention, one of the conditions for $V_{GATE}$ transiting from the low level to the high level is that the stored energy of the booster inductor 34 almost completely releases and the falling portion of the reference signal $V_{RAMP}$ reaches the lowest point. In other words, the time taken for the falling portion of the reference signal $V_{RAMP}$ to reach the lowest point is just the time at least in which the switch 36 shall be maintained in an off state, which is defined as the minimum off-time ($T_{OFF-MIN}$, $T_{OFF-MIN}'$). As shown in FIGS. 8a and 8b, the time spent in the whole falling portion of the reference signal $V_{RAMP}$ will be extended as $V_{CMP}$ increases; i.e., the minimum off-time $T_{OFF-MIN}$ varies adaptively with the load.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A control apparatus applied in a power-factor-correction (PFC) power converter comprising a primary winding, an auxiliary winding and a power switch, wherein the primary winding is coupled to receive a input voltage and is controlled by the power switch to increase or release the stored energy, the control apparatus comprising:
    a reference signal generator, for generating a reference signal having a rising portion and a falling portion, the slew rate of the reference signal being adjustable;
    a detection circuit, for determining whether the input voltage approaches a zero voltage and detecting whether the stored energy of the primary winding is almost completely released; and
    a driving circuit, for turning on the power switch to increase the stored energy of the primary winding when the stored energy of the primary winding is almost completely released and the falling portion of the reference signal reaches a predetermined condition;
    wherein the slew rate of the reference signal is reduced when the input voltage approaches the zero voltage.

2. The control apparatus as claimed in claim 1, wherein the reference signal generator comprising:
    a capacitor;
    a first current source, for charging the capacitor to generate the rising portion of the reference signal when the power switch is turned on; and
    a second current source, for discharging the stored charge in the capacitor to generate the falling portion of the reference signal when the power switch is turned off.

3. The control apparatus as claimed in claim 2, wherein the current value of the first current source is reduced when the input voltage approaches the zero voltage.

4. The control apparatus as claimed in claim 2, wherein the current value of the second current source is reduced when the input voltage approaches the zero voltage.

5. The control apparatus as claimed in claim 2, wherein the capacitance of the capacitor is increased when the input voltage approaches the zero voltage.

6. The control apparatus as claimed in claim 1, wherein the detection circuit is coupled to the auxiliary winding for detecting through the auxiliary winding whether the input voltage approaches the zero voltage when the stored energy of the primary winding is increased.

7. A control method applied in a power-factor-correction (PFC) power converter comprising a primary winding, an auxiliary winding and a power switch, wherein the primary winding is coupled to receive a input voltage and is controlled by the power switch to increase or release the stored energy, the method comprising:
    generating a reference signal having a rising portion and a falling portion;
    detecting whether the input voltage approaches the zero voltage;
    reducing the slew rate of the reference signal when the input voltage approaches the zero voltage;
    detecting the stored energy of the primary winding;
    detecting the falling portion of the reference signal; and
    turning on the power switch to increase the stored energy of the primary winding when the stored energy of the primary winding is almost completely released and the falling portion of the reference signal reaches a predetermined condition.

8. The method as claimed in claim 7, further comprising: generating the rising portion of the reference signal by charging a capacitor with a current source; and
    reducing the current value of the current source, when the input voltage approaches the zero voltage.

9. The method as claimed in claim 7, further comprising: generating the falling portion of the reference signal by discharging a capacitor with a current source; and
    reducing the current value of the current source, when the input voltage approaches the zero voltage.

10. The method as claimed in claim 7, further comprising: providing a capacitor, and generating the reference signal according to a terminal voltage of the capacitor; and
    increasing the capacitance of the capacitor, when the input voltage approaches the zero voltage.

* * * * *